Patented Nov. 29, 1932

1,889,371

UNITED STATES PATENT OFFICE

WILHELM NEELMEIER, OF LEVERKUSEN-ON-THE-RHINE, AND EDMUND VAN HULLE, OF COLOGNE-DEUTZ, GERMANY, ASSIGNORS TO GENERAL ANILINE WORKS, INC., OF NEW YORK, N. Y., A CORPORATION OF DELAWARE

PROCESS OF PRODUCING ANILINE-2 : 5-DISULPHONIC ACID

No Drawing. Application filed February 3, 1928, Serial No. 251,734, and in Germany February 18, 1927.

The present invention concerns the manufacture of aniline-2:5-disulphonic acid.

In accordance with the present invention pure aniline-2:5-disulphonic acid is obtained in a simple manner and in excellent yield by sulphonating aniline-3-sulphonic acid with an excess of oleum at an elevated temperature and, when the monosulphonic acid has disappeared by heating, the mixture of di- and tri-sulphonic acids thus obtained with a diluted acid.

The following example will illustrate our invention:

Example.—17.3 parts by weight of aniline-3-sulphonic acid are stirred into 46 parts by weight of monohydrate. After the addition of 23 parts by weight of 65% oleum, the mixture is heated for 6 hours to 160° C. The sulphonation mixture is now diluted with 100 parts by weight of water in a lead-lined vessel and boiled for 5 hours under reflux. The solution, originally containing about 25% of trisulphonic acid now contains only aniline-2:5-disulphonic acid. On salting out the mixture with 40 parts by weight of common salt, after diluting to about 400 parts by weight with water, the acid sodium salt is separated in the solid form with a yield amounting to over 90% of the theory.

The quantities of acid specified, as well as the concentrations and temperatures are only mentioned for the sake of guidance. In carrying out the process it is essential to effect sulphonation of the aniline-3-sulphonic acid to the extent that the monosulphonic acid can no longer be detected and the subsequent treatment of the sulphonation mixture with dilute acids until all the trisulphonic acid is disassociated. This can likewise be effected by boiling the sulphonation mixture with hydrochloric acid after the same has been freed from sulphuric acid in the usual manner.

We claim:

1. In the process for the manufacture of aniline-2:5-disulphonic acid, the steps which comprise sulphonating aniline-3-sulphonic acid with oleum until the monosulphonic acid has disappeared and boiling the resulting mixture of di- and tri-sulphonic acids with a dilute mineral acid until all trisulphonic acid is dissociated.

2. In the process for the manufacture of aniline-2:5-disulphonic acid, the steps which comprise sulphonating aniline-3-sulphonic acid with oleum until the monosulphonic acid has disappeared and boiling the resulting mixture of di- and tri-sulfonic acids with dilute sulphuric acid until all trisulphonic acid is dissociated.

3. In the process for the manufacture of aniline-2:5-disulphonic acid, the steps which comprise sulphonating aniline-3-sulphonic acid with oleum until the monosulphonic acid has disappeared and refluxing the resulting mixture of di- and tri-sulfonic acids with dilute sulphuric acid for several hours.

In testimony whereof we have hereunto set our hands.

WILHELM NEELMEIER.
EDMUND VAN HULLE.